United States Patent [19]
Carr et al.

[11] Patent Number: 5,361,353
[45] Date of Patent: Nov. 1, 1994

[54] SYSTEM FOR PARSING MESSAGE UNITS FROM AN UNSTRUCTURED MESSAGE STREAM OF INTERLEAVED MESSAGE UNITS TO FORM STRUCTURED MESSAGES

[75] Inventors: Brian P. Carr, Jefferson Valley, N.Y.; David A. Glowny, Naugatuck, Conn.; Colette A. Mastrangelo, Danbury, Conn.; Paul M. Mayer, Middlebury, Conn.; Arthur Seltzer, Richboro, Pa.; Peter D. Shier, Danbury, Conn.

[73] Assignee: International Business Machines Corporation, Armonk, N.Y.

[21] Appl. No.: 771,061

[22] Filed: Oct. 2, 1991

[51] Int. Cl.$^5$ ............................................. G06F 13/00
[52] U.S. Cl. ................................. 395/700; 364/222.2; 364/238; 364/260; 364/260.9; 364/284; 364/284.3; 364/DIG. 1
[58] Field of Search ....................... 395/700, 600, 650

[56] References Cited

U.S. PATENT DOCUMENTS

| | | | |
|---|---|---|---|
| 4,787,035 | 11/1988 | Bourne | 364/300 |
| 4,905,138 | 2/1990 | Bourne | 364/200 |
| 5,006,992 | 4/1991 | Skeirik | 364/513 |
| 5,062,147 | 10/1991 | Pickett et al. | 364/900 |

OTHER PUBLICATIONS

IBM Technical Disclosure Bulletin, vol. 32, No. 9A, Feb. 1990 "Technique for Enhancing the Operability of MVS Systems".

Primary Examiner—Thomas C. Lee
Assistant Examiner—Peter Y. Wang
Attorney, Agent, or Firm—William A. Kinnaman, Jr.; Mark S. Walker

[57] ABSTRACT

A system and method for analyzing computer generated message streams. Electronic messages containing displayable message information are parsed according to a set of parsing rules. The resulting tokens are organized into parse state records and stored for further analysis. Current and previous parse state records are analyzed by the application of inference rules to develop a structured message. Content analysis of the structured or unstructured message is accomplished by application of a second set of inference rules. Content analysis attempts to select an automated response for transmission to the message generating computer system. Content analysis employs a binary search through a subset of inference rules loaded for a particular system. Changes to operating system or operator causes a different subset of rules to be loaded.

8 Claims, 2 Drawing Sheets

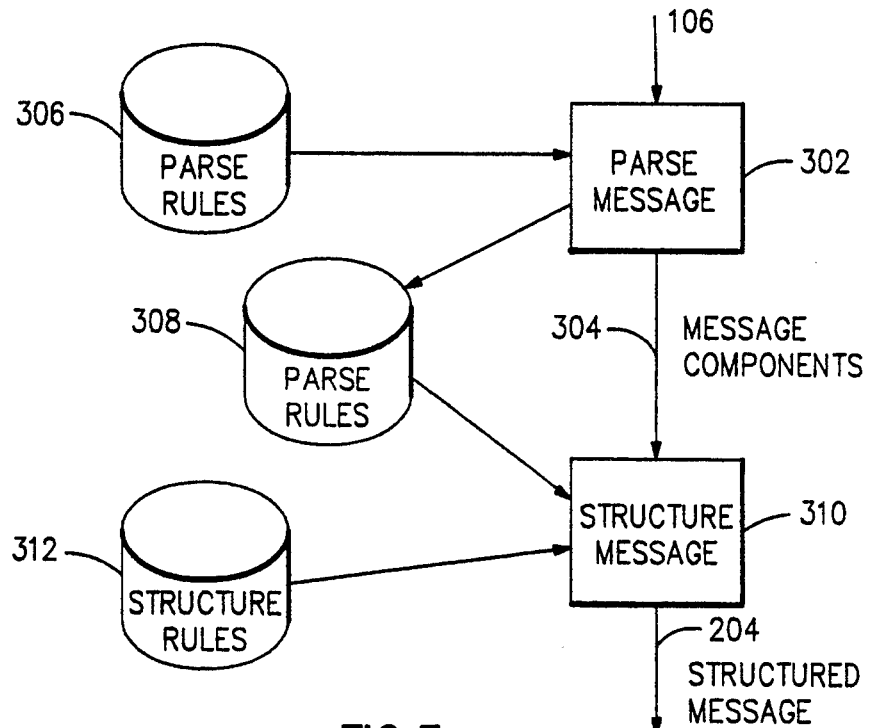

SYSTEM FOR PARSING MESSAGE UNITS FROM AN UNSTRUCTURED MESSAGE STREAM OF INTERLEAVED MESSAGE UNITS TO FORM STRUCTURED MESSAGES

BACKGROUND OF THE INVENTION

1. Field of the Invention

The present invention relates to information processing system operations and, in particular, relates to the automated analysis of and response to computer generated messages. More particularly, the present invention employs inference rules and artificial intelligence techniques to determine message content and appropriate response.

2. Background and Prior Art

Large computer systems generate messages to the computer operators informing them of computer operations status, error messages, and requests for operator action. Historically these messages have been displayed on a computer operator console for action by the operator. As computer systems have become more complex and capable of higher transaction rates, the number of messages generated to the operator has greatly increased. In addition, business interest in increasing the productivity of computer operators has resulted in the introduction of automated tools to assist the operators. Effective automated computer operations requires that the message stream generated by the computer system be analyzed and, if possible, an automated response be generated and sent to the computer system.

The analysis of and response to messages is complicated by the fact that many of the messages are produced by operating systems and programs that do not anticipate the use of automated operations tools. Thus, many messages are not well structured and may be difficult to reliably analyze. In addition, messages may consist of many parts that are not received sequentially. For example, a multiline message may begin transmission to the operator only to be interrupted by a higher priority message indicating an error or the need for operator action. While a human operator can typically deal with the non-sequential receipt of message lines, existing automated operations program have not been able to do so.

The diversity of message formats has typically required detailed message specification tables for automated operations. This has required considerable programming effort and, in some cases, has limited the capabilities of automated operation systems. In addition, the generation of detailed message tables frequently limits the application of the automated system to a single computer for which the tables were generated. Tailoring tables based upon system or operator parameters typically is not feasible. Finally, most existing automated operation systems perform sequential searches through the message tables to locate any applicable messages. This results in poor performance in any system with large message tables.

Thus, the technical problem to be solved is the creation of an automated operations system that can accept interleaved messages from a variety of systems, and be able to analyze and appropriately respond or manage the messages in an efficient manner.

SUMMARY OF THE INVENTION

The present invention is therefore directed toward providing an automated analysis and response facility for a large computer system. The present invention introduces a method for developing well structured messages from explicit and implicit message line content. In addition, the present invention provides an improved method for analyzing the message content based upon an inference analyzer employing a database of message rules. The rules database is randomly accessible and provides linked processing operations for efficient specification and operation.

It is therefore an object of the present invention to provide a system for interpreting and responding to computer generated messages. It is a further object of the present invention to structure computer generated messages into a well structured message stream for analysis. It is a further object of the invention to analyze structured messages to generate an appropriate response to the computer system.

It is yet another object of the invention to apply inference rules to a computer generated message to determine an automated response to said message.

These and other objects of the invention will become clear through the following discussion of the preferred embodiment of the present invention with reference to the appended drawings.

BRIEF DESCRIPTION OF THE DRAWING

FIG. 3 is a structure diagram showing the flow of the message structuring component.

FIG. 4 is a table specifying the rules used in inference processing according to the present invention.

DETAILED DESCRIPTION OF THE PREFERRED EMBODIMENT

Figure 1:
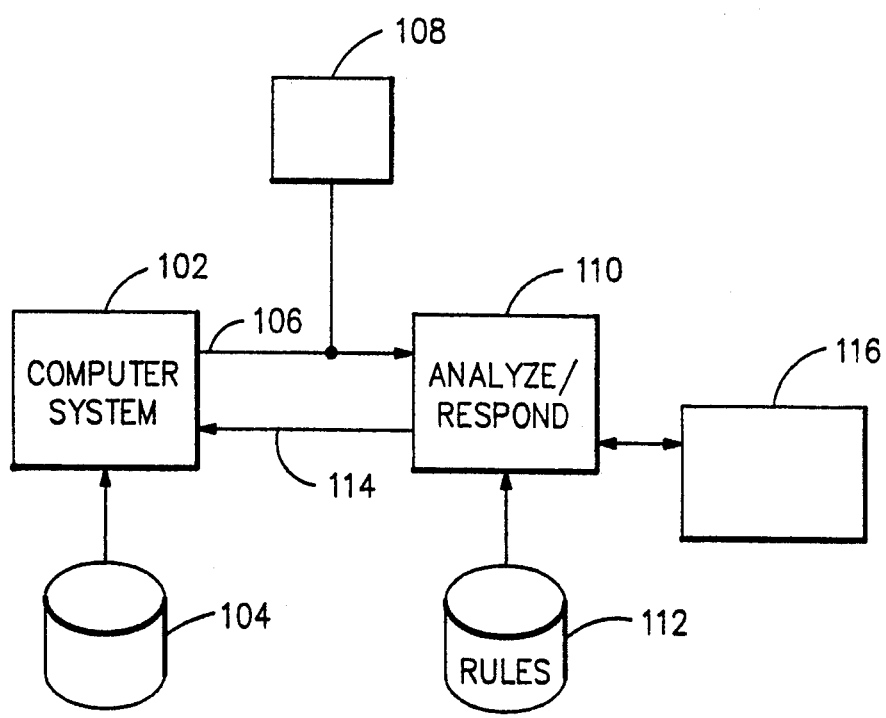
FIG. 1 is a block diagram showing a computer system to which the present invention may be applied.

The preferred embodiment of the present invention operates as shown generally in FIG. 1. A computer system 102 operates to perform certain work based upon processing requests and data stored, for example, in disk storage 104. As the system operates, messages are generated to message stream 106. These messages can be alternately displayed on console 108 or sent for analysis to automated operations facility 110. The automated operations facility 110 analyzes the message stream with the assistance of message rules 112 and generates responses back to the system 114. Automated operations facility 110 replaces console 108 with enhanced console display 116 displaying messages for operator action and resolution.

Figure 2:
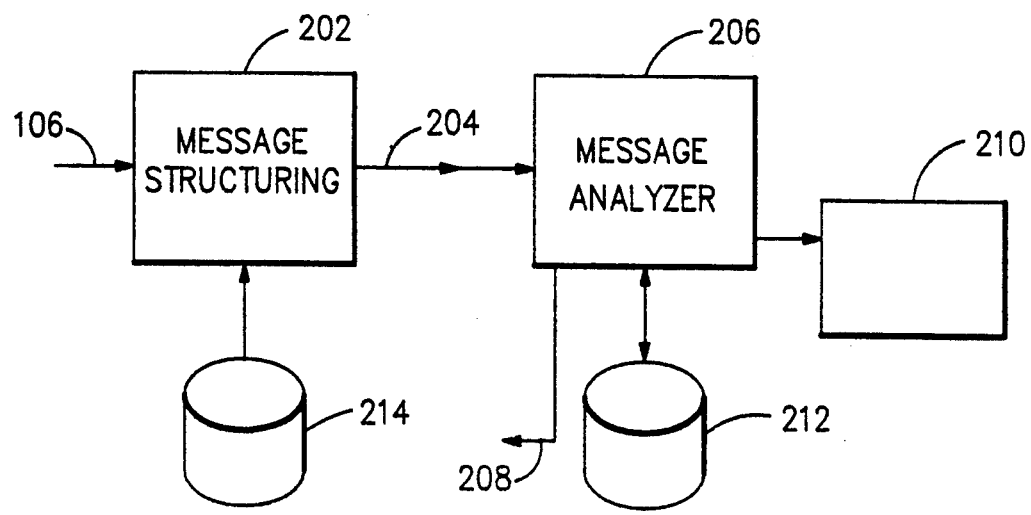
FIG. 2 is a block diagram showing the structuring message analysis processes of the present invention.

The automated operations facility 110 consists of a number of the components shown generally in FIG. 2. The message stream 106 is first analyzed by a message structuring process 202 using structure rules 214 resulting in a structured message stream 204. Structured message stream 204, in turn, is analyzed by message analyzer 206. The message analyzer generates responses 208 and operator displays 210 based upon analysis rules 212.

While the preferred embodiment employs both message structuring and message analysis components, it is possible to develop an automated operations system using only one of the two components. Thus, for example, in an alternate embodiment, message structuring is used alone to improve the structure of messages for operator display on console 116. In another embodiment, message analyzer 206 is employed to analyze raw unstructured message stream 106 by the addition of rules to database 212. The use of both components, however, provides increased message analysis effectiveness. Each of these components will be described in greater detail below.

Message stream 106 generated by computer system 102 typically contains a series of simple plain text messages intended for console display. Each message will typically contain a message identifier or command field as well as text for display. The first problem addressed by the preferred embodiment of the present invention is restructuring the plain text messages into a well structured message capable of automated analysis. Restructuring is required because the messages generated by the system may not contain all needed information for analysis. For example, the message generated may assume the existence of preceding or succeeding messages which contain information needed for operator action. It is therefore necessary for the message structuring utility to attempt to reconstruct and collect assumed or missing information.

The message structuring system of the present invention first parses 302 (FIG. 3) each message in message stream 106 using parsing rules of known patterns and delimiting characters to extract 304 the message components or tokens. The parsing rules are stored in database 306 which is a portion of structure rules database 214. Next, structuring rules 312 (also part of database 214) are applied to determine the interrelationship between two or more messages. The system is able to recover information and meaning not explicitly contained in the plain text message by analyzing preceeding message lines. Finally, the system constructs a structured message 204 based upon the parsed components and software recovered information.

As the system scans and analyzes each message, it tracks the current parse state. The system maintains a number of prior parse states 308 to allow for the handling of asynchronously received higher priority messages which may interrupt a multiline message. Each parse state record contains information about that message including:
 destination address;
 broadcast group;
 message identifier;
 time stamp;
 actual text of the message.

In addition, the parse state record includes a plurality of flags indicating conditions detected during the parsing of the message. All information is recorded in the state record 308 before further interpretation by the structuring rules in process 310.

Next, structuring rules 312 are applied 310. These rules examine the current and previous parse state records 308 to develop a final message structure and to assign missing data. The rules are based on certain facts or assumptions about the message stream. For example, in a system where a certain character is used to mark the end of a multiple line message, structuring rules can be used to scan for this marking. In addition, the system can apply the rules to add markings to message text lines denoting their position within a multiple line message stream. The structuring rules can also be used to extract structured message components from prior parse state records to supply information which was not present in a particular message line but which were collected during the parsing of prior message lines. Thus, the structuring rules apply information from previous parse state records to fill in missing data.

The combination of scanning and structuring rule application allows the generation of a structured message stream from the message structuring system 202. Each packet delivered by the message structuring system 202 to a downstream application will contain structured messages containing more complete information than was available in the plain text messages. Supplying a structured message simplifies downstream automated operations tasks.

Message analyzer 206 accepts either structured or unstructured messages for analysis. The analysis operations proceed in a similar manner whether the message is structured or unstructured, though the structured message allows greater power and flexibility in interpretation.

The message analyzer 206 attempts to analyze the message and to trigger a responsive action based on the message content. Prior art message analysis implemented message tables containing an entry for each possible message. These systems have several disadvantages. First, the tables frequently require the system user to do some programming. Second, only one table can usually be active because they are centrally located. Finally, the tables are sequentially searched which can be slow when a large number of entries exist.

The preferred embodiment of the present invention replaces the traditional central message table with a distributed filter attached to the message stream. Message analyzer 206 acts as a filter applying rules stored in a relational database 212. The preferred embodiment employs a relational database to provide efficient searching and updating. The message analyzer filter 206 loads a subset of the rules from the database depending on the expected console message stream. In this way different message analyzers can be applied at different times for different systems existing within a particular enterprise without reprogramming the systems. The rules subset selected for loading is based on a host system identifier, operator identifier, and the type of console in use. Thus, an enterprise with a variety of computer systems and consoles may easily restructure its operations without reprogramming the automated operations system. Since this invention is implemented in a distributed system, reconfiguration allows a single physical workstation to be used to operate different computer systems at different times. This also allows reallocation of operator workload with an ability to assign a single console to each machine during peak periods or several machines to a single console during off times.

In the preferred embodiment, the message identifier for each message or a defined search field within the message text is used to select inference rules based upon full or partial field matches. The invention allows the use of "wildcard" characters in the rule specifications allowing match on one or more actual characters of the message identifier or search field. To speed searching, a special linked data structure is built for the inference rules.

The message analyzer 206 performs a binary search based upon a search field comprising message identifier or command field. The binary search attempts to find the first inference rule that matches the search argument or to stop at the rule preceeding the point in the table where the search identifier would be inserted logically. Pointers are provided to other rules for which evaluation is required. This pointer is labelled "next to check"

and enables the specification of a logical rule application structure. For example, this organization provides for the rules associated with the exactly matched message and rules for a class of related messages. The rules are applied from specific to general.

An example of a rule table according to the present invention is shown in FIG. 4. The first column of FIG. 4 shows the message identifier or command and can be specified in terms of characters present and a wildcard "*" representing any character. The next column is the "next to check" pointer which directs the logic for applying the rules. Finally, the last column is an "apply next" indicator indicating whether a sequence of rules should be applied based on an initial match. An entry of "no" in the apply next field stops sequential rule application.

Message analysis using the table proceeds as follows. A message is received containing the message ID "IPLXYZW". The binary search stops at the rule "IPLXXXXW" 401. Since this is not an exact match, the "next to check" pointer is followed to return to message "IPLXX*" 402 which also fails to match and is not aplied because it does not exactly match the characters in the message ID. Next, the "next to check" pointer directs the filter to check "IPL*" 403 which does match. The message analyzer then applies the rules associated with IPL* until the "apply next" field is false (No). It then follows the "next to check" pointer back and applies all rules encoded with "*" 404. Finally, a special match string combining the last character of the command with a wildcard, i.e. "*W" in the example above, is performed. The filter performs a separate binary search with this string and applies the rules as above. A flag is maintained to ensure that rules meeting more than one criterion are not applied more than once.

The inference rules are placed into the database 212 through a user interface which allows the user to enter data in display panels directing actions to be taken based upon the rule. These actions can include coloring the displayed message a particular color, holding the message on the screen, suppressing the message from the operator, sounding an audible alarm, routing the message to a defined database, or routing the message to a particular program. In this manner, the specification of actions to occur can be easily accomplished without programming.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. In a data processing system in which an unstructured message stream is generated comprising an interleaved sequence of message units from two or more messages, whereby said unstructured message stream contains discontious message units that are part of the same message, a method of transforming said unstructured message stream into a structured message stream associating message units that are part of the same message, comprising the steps of:

identifying successive message units in said unstructured stream of interleaved message units;

parsing each of said successive message units into message components in accordance with a set of parsing rules;

storing the results of said parsing step for each of said message units for use in analyzing subsequent message units;

analyzing the message components of the current message unit and the results of said parsing step stored for previous message units in accordance with a set of structure rules to determine whether the current message unit is part of the same message as a previous message unit; and generating a structured message stream associating discontiguous message units of said unstructured message stream that are determined to be part of the same message.

2. The method of claim 1 wherein said generating step comprises the step of augmenting the current message unit with information whether the current message unit is part of the same message as a previous message unit.

3. The method of claim 2 wherein the current message unit is augmented with information indicating the relative position of said message unit within the message of which it is a part.

4. The method of claim 2 wherein the current message unit is augmented with text information from one or more previous message units of the same message.

5. The method of claim 1 wherein a predetermined indicator is used to mark the end of a message, said analyzing step including the step of scanning for said indicator.

6. In a data processing system in which an 2 unstructured message stream is generated comprising an interleaved sequence of message units from two or more messages, whereby said unstructured message stream contains discontiguous message units that are part of the same message, apparatus for transforming said unstructured message stream into a structured message stream associating message units that are part of the same message, comprising:

means for identifying successive message units in said unstructured stream of interleaved message units;

means for parsing each of said successive message units into message components in accordance with a set of parsing rules;

storage means for storing the output of said parsing means for each of said message units for use in analysing subsequent message units; and structuring means for:

analyzing the message components of the current message unit and the content of said storage means for previous message units in accordance with a set of structure rules to determine whether the current message unit is part if the same message as a previous message unit; and generating a structured message stream associating discontinuous message units message units of said unstructured message stream that are determined to be part of the same message.

7. The method of claim 1 wherein said message units are lines of text.

8. The apparatus of claim 6 wherein said message units are lines of text.

* * * * *